United States Patent [19]

Booth

[11] 3,731,845
[45] May 8, 1973

[54] SYSTEM FOR DISPENSING CHILLED CARBONATED WATER

[76] Inventor: Jack J. Booth, P.O. Box 507, Carrollton, Tex. 75006

[22] Filed: Nov. 23, 1970

[21] Appl. No.: 91,873

[52] U.S. Cl. ............222/67, 222/129.1, 222/318
[51] Int. Cl. ..............................................B67d 5/08
[58] Field of Search................222/64, 65, 67, 129.1, 222/135, 136, 146, 195, 318; 261/122, 140, DIG. 7; 137/391, 411

[56] References Cited

UNITED STATES PATENTS

| 3,370,755 | 2/1968 | Querner | 222/318 X |
|---|---|---|---|
| 2,750,076 | 6/1956 | Welty et al. | 222/129.1 |
| 3,211,331 | 10/1965 | Marigic et al. | 261/DIG. 7 X |
| 2,588,677 | 3/1952 | Welty et al. | 137/391 X |
| 2,537,266 | 1/1951 | Granberg | 222/318 |
| 3,255,920 | 6/1966 | Cornelius | 222/318 X |
| 3,403,524 | 10/1968 | Mitchell | 261/DIG. 7 X |

Primary Examiner—Robert B. Reeves
Assistant Examiner—L. Martin
Attorney—Richards, Harris & Hubbard

[57] ABSTRACT

A carbonation unit in a closed loop including a circulation pump, dispensing valves, a restrictor and a pressure regulated source of fresh makeup water with a float controlled inlet to the carbonation unit, which is normally restricted as carbonated water within the unit approaches a predetermined level. A bypass valve across the pump is open o recirculate water within the pump when the carbonation unit inlet becomes restricted. Water withdrawal from the carbonator through the dispenser valves opens the inlet for increased flow to the carbonator accompanied by a pressure drop to close the pump bypass valve. Pump suction drops the pressure across the restrictor to draw makeup water into the loop.

5 Claims, 1 Drawing Figure

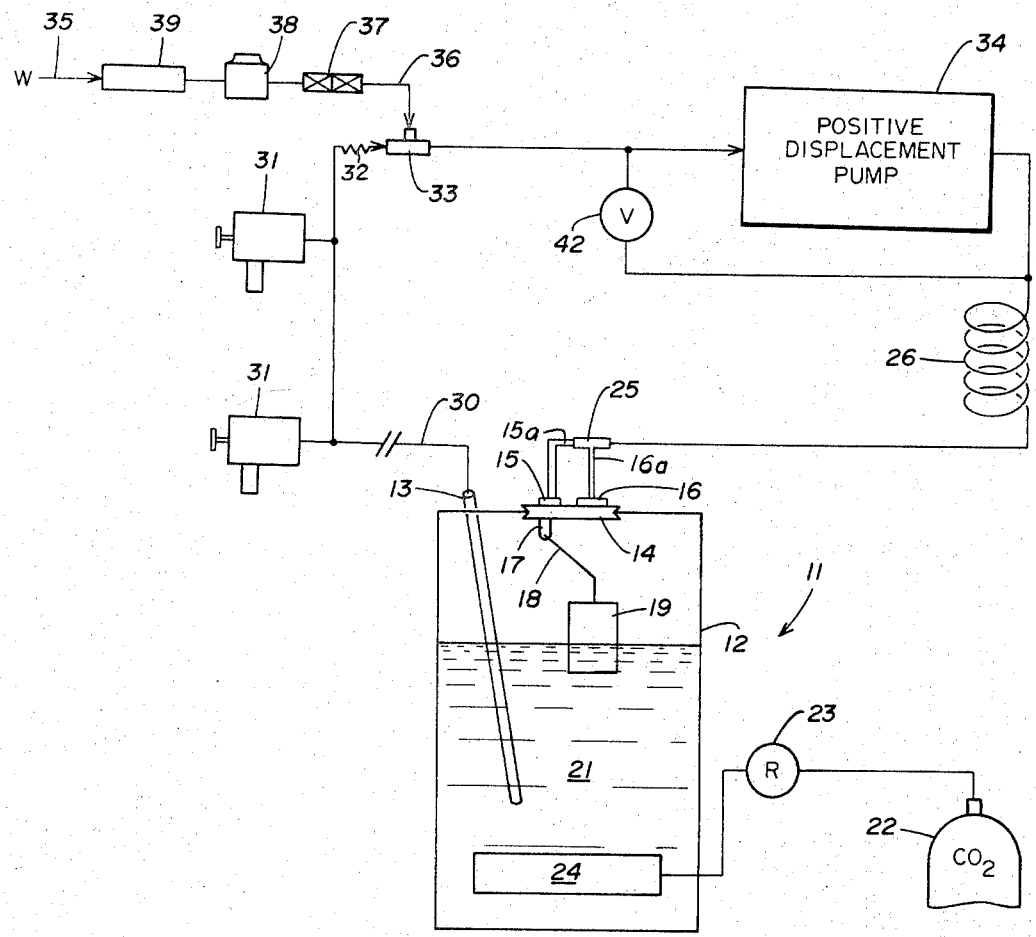

SYSTEM FOR DISPENSING CHILLED CARBONATED WATER

BACKGROUND OF THE INVENTION

1. Field of the Invention

The invention relates to a system for circulating chilled carbonated water, and more particularly, to a system which employs pressure balances to draw fresh makeup water into the circulation loop when carbonated water is dispensed.

2. History of the Prior Art

In the past, systems for circulating carbonated water have continuously circulated full flows of water within a closed loop and have employed periodically operated pumps to introduce fresh makeup water into the loop as carbonated water is dispensed. The drop in water level within the carbonation unit, as carbonated water is dispensed, is sensed by a detector which actuates a solenoid to energize a pump. The pump introduces fresh makeup water into the system through a valve. One example of such a system is that disclosed in U. S. Pat. No. 3,058,620 to W. R. Kromer. Prior art circulation systems have required a number of pieces of apparatus such as contol solenoids and pump controls which are eliminated by the system of the present invention.

SUMMARY OF THE INVENTION

The invention includes a system for circulating chilled carbonated water which automatically introduces fresh makeup water in response to the withdrawal of carbonated water through a dispenser. More particularly, there is provided a system for circulating carbonated water having a pressurized carbonator with a float control inlet. A pump is connected in a closed loop leading from the carbonator to a dispenser and from the dispenser through a restrictor in the loop back to the suction side of the pump. A makeup water supply line is connected through a pressure regulator into the loop at a point between the restrictor, and the pump to supply makeup water at a pressure less than the operating pressure of the carbonator.

BRIEF DESCRIPTION OF THE DRAWING

For a more complete understanding of the present invention and for further objects and advantages thereof, reference may now be had to the following description taken in conjunction with the accompanying drawing in which:

FIG. 1 is a schematic drawing of a system for circulating chilled carbonated water constructed in accordance with the invention.

DETAILED DESCRIPTION

A carbonator 11 having a housing 12 which is encircled by a refrigeration means (not shown), may be of the type shown in FIG. 1 of U.S. Pat. No. 3,472,425. An outlet line 13 for carbonated Water extends outside of the carbonator from the bottom thereof. Preferably the top of the carbonator 11 is formed by a closure member 14 through which a pair of spray regulator fittings 15 and 16 extend to form a large float control inlet and a small bypass inlet respectively. The spray regulator fitting 15 includes a float controlled actuation valve 17 which is actuated by a lever arm 18 and a float 19. Float 14 is maintained at the level of the chilled carbonated water 21 within the carbonator 11. Fitting 16 forms a small bypass inlet which remains open at all times. Carbon dioxide gas is introduced into the carbonator 11 from a pressurized container 22 through a pressure regulator 23. A gas discharge unit 24 is located near the bottom of the carbonator 11.

The carbonator 11 is connected into a closed loop with a pump 34 by one arm of "T" connection 25 which is connected to the large float control inlet 15 through a short length of tubing. The tubing may be on the order of three-sixteenths inch inside diameter. The base leg of the "T" connection 25 is connected to the small bypass inlet 16 by means of a highly restricted line 25a. For example, a section of 0.062 inch tubing approximately 9 inches in length has been found adequate. The input arm of the "T" connection 25 is connected through a length of conduit to the end of a chilling coil 26 which is in turn coupled to the output side of the pump 34.

Leading from the carbonator is conduit 13 and a distribution line 30 which includes a plurality of spaced dispenser outlets 31. Distribution line 30 may be formed of from 10 to 300 feet of ½ in,h inside diameter line. Such lengths have proven satisfactorily to circulate chilled carbonated water to a plurality of spaced apart dispensing locations. Line 30 is connected to a restrictor 32. In one embodiment, a coil of 200 feet of such tubing was employed. The restrictor may comprise approximately 18 inches of 1/8 inch inside diameter line. The restrictor 32 is connected to the input arm of a "T" connection 33, the output arm of which is connected to the suction side of the positive displacement recirculation pump 34. The base of the "T" connection 33 is connected to a fresh water supply line 35 through a short length of 1/4 inch line 36, a pair of back check valves 37, a pressure regulator 38, and a filter 39. The water pressure regulator 38 maintains the pressure of the makeup water at less than the operating pressure of the carbonator 11. For a carbonator which operates within a pressure range of from 30 to 50 pounds/square inch, a makeup water pressure regulator setting of the order of 20 pounds/square inch has been shown to operate satisfactorily. This may vary with the $CO_2$ pressure.

The discharge side of the recirculation pump 34 is connected to the input of the cooling coil 26, the output of which is connected to the "T" connection 25. A bypass valve 42 is connected across the input and output ports of the pump 34. The valve 42 is set to remain closed at operating pressures below the range of 60 to 90 pounds/square inch when the float 19 in the carbonation unit 11 is lowered to open inlet 15.

In operation, when carbonated water 21 within the unit 11 is at a desired level, the float 19 closes the valve 17. When the large inlet 17 is closed, a very small amount of water from the recirculation loop passes through "T" connection 25 through restrictive line 25a into the carbonator through the small bypass inlet of the fitting 16. When float controlled inlet 17 is closed, the bypass valve 42 opens to allow most of the water passing through pump 34 to circulate through the pump 34 with only a small fraction being delivered to carbonator 11.

When water is withdrawn from the system by means of one of the dispensers 31, the water level within the carbonator 11 drops. As the float 19 falls, valve 17 opens. The resultant drop in pressure at the pump outlet closes bypass valve 42 to allow more water to flow from the discharge side of the pump 34 through the cooling coil 26 and the "T" connection 25 and the large float control inlet to replenish the carbonator. The water is sprayed through a carbon dioxide gas atmosphere within the carbonation unit 11 by means of the spray fitting 15.

As water is drawn into the suction side of the pump 34, water circulates through the line 30 and passes through the restrictor 32. The pressure on the discharge side of the restrictor 32 drops to a pressure lower than pressure of the fresh water supply at the "T" connection 33. This causes fresh makeup water to flow from the supply line 35 through filter 39, pressure regulator 38 and back check valves 37 into the suction side of pump 34. The pressure drop across the restrictor 32 enables the system to automatically introduce fresh makeup water into the system to compensate for the amount of water which was withdrawn from the system by means of a dispenser 31. The makeup water which is drawn through the pump is then passed primarily through spray regulator fitting 15 to be carbonated. The system may automatically replenish water in the closed recirculation loop. The system does not require the more elaborate apparatus of valves, solenoids and intermitently operated fresh water pumps that have characterized prior systems.

It may not be desired to spray recirculated water into the unit 11. In such a case a bypass line may be connected from the base of the "T" connection 25 to the side or bottom of the carbonator 11 below the level of the carbonated water in the reservoir. Further, the float 19 and fitting may be so proportioned and constructed as to restrict the fitting 15 but never completely close the same. Thus the line 25a may be eliminated in which case a controlled leak provided at the float seat or in the fitting leading to the float seat would provide for the continuous circulation of the carbonated water.

Having described the invention in connection with certain specific embodiments thereof, it is to be understood that further modifications may now suggest themselves to those skilled in the art and it is intended to cover such modifications as fall within the scope of the appended claims.

What is claimed is:

1. A system for circulating chilled carbonated water comprising:
    a pressurized carbonator having a liquid level controlled inlet structure including a "T" connection one output of which is connected to a large float control inlet of said carbonator through a non-restricted conduit, the other outlet of which is connected to a small bypass inlet of said carbonator through a highly restricted conduit;
    a pump connected in a closed loop leading from said carbonator to a dispenser and from said dispenser to said pump, the output of said pump being connected to the input of said "T" connection to continuously supply a small flow of water into said carbonator through said small bypass inlet and a large flow of water into said carbonator through said float control inlet, upon actuation of a float within said carbonator,
    a restrictor in said loop at the suction side of said pump;
    a makeup water supply line connected into said loop at a point between said restrictor and said pump; and
    a water pressure regulator in said supply line to supply makeup water at a pressure less than the operating pressure of said carbonator when said dispenser is opened to cause reduced pressure at the inlet to said pump upon increased flow to said carbonator.

2. A system for circulating chilled carbonated water comprising:
    a pressurized carbonator having a liquid level float controlled inlet structure including a valve seat having a controlled leak;
    a pump connected in a closed loop leading from said carbonator to a disenser and from said dispenser to said pump to produce a continuous circulation of water through the controlled lead in said valve seat;
    a restrictor in said loop at the suction side of said pump;
    a makeup water supply line connected into said loop at a point between said restrictor and said pump; and
    a water pressure regulator in said supply line to supply make up water at a pressure less than the operating pressure of said carbonator and said dispenser is opened to cause reduced pressure at the inlet to said pump upon increased flow to said carbonator.

3. A system for cIrculating chilled carbonated water comprising:
    a pressurized carbonator having a liquid level controlled inlet structure,
    a pump connected in a closed loop leading from said carbonator to a dispenser and from said dispenser to said pump,
    a restrictor in said loop at the suction side of said pump,
    a makeup water supply line connected into said loop at a point between said restrictor and said pump,
    a water pressure regulator in said supply line to supply makeup water at a pressure less than the operating pressure of said carbonator when said dispenser is opened to cause reduced pressure at the inlet to said pump upon increased flow to said carbonator, and
    said inlet structure comprises flow structure including a float and float seat completely closed when the water level in said carbonator reaches a predetermined level and further comprises a structure forming a restricted bypass flow channel for continuous circulation of carbonated water through said loop.

4. A system for circulating chilled carbonated water comprising:
    a pressurized carbonator having a liquid level controlled inlet structure closable except for a controlled leak therethrough,
    a pump connected in a closed loop leading from said carbonator to a dispenser and from said dispenmer to said pump, a restrictor in said loop at the suction side of said pump, a makeup water supply line connected into said loop at a point between said restrictor and said pump, and a water pressure regulator in said supply line to supply makeup water at a pressure less than the operating pressure of said carbonator when said dispenser is opened to cause reduced pressure at the inlet to said pump upon increased flow to said c8rbonator.

5. A system for circulating chilled carbonated water comprising:

a pressurized carbonator having a liquid level controlled inlet structure, a pump connected in a closed loop leading from said carbonator to a dispenser and from said dispenser to said pump, a restrictor in said loop at the suction side of said pump, a makeup water supply line connected into said loop at a point between said restrictor and said pump, a water pressure regulator in said supply line to supply makeup water at a pressure less than the operating pressure of said carbonator when said dispenser is opened to cause reduced pressure at the inlet to said pump upon increased flow to said carbonator, and said inlet structure of said carbonator includes a restricted diameter line between said carbonator and the output of said pump continuously to supply a very small amount of water into said carbonator.

* * * * *